(12) United States Patent
Wu et al.

(10) Patent No.: US 8,179,645 B2
(45) Date of Patent: May 15, 2012

(54) NETWORK COMMUNICATION PROCESSING APPARATUS WITH ESD PROTECTION

(75) Inventors: Chien Ming Wu, Tao Yuan County (TW); Tay-Her Tsaur, Tainan (TW)

(73) Assignee: Realtek Semiconductor Corp., Hsinchu (TW)

(*) Notice: Subject to any disclaimer, the term of this patent is extended or adjusted under 35 U.S.C. 154(b) by 360 days.

(21) Appl. No.: 12/362,301

(22) Filed: Jan. 29, 2009

(65) Prior Publication Data

US 2009/0195950 A1 Aug. 6, 2009

(30) Foreign Application Priority Data

Jan. 31, 2008 (TW) ................................ 97103633 A

(51) Int. Cl.
*H02H 9/00* (2006.01)
(52) U.S. Cl. .......................................................... 361/56
(58) Field of Classification Search ...................... 361/56
See application file for complete search history.

(56) References Cited

U.S. PATENT DOCUMENTS

| | | | | |
|---|---|---|---|---|
| 5,343,461 A * | 8/1994 | Barton et al. | ................. | 370/249 |
| 5,995,353 A * | 11/1999 | Cunningham et al. | ........ | 361/111 |
| 6,366,166 B1 * | 4/2002 | Belot | ............................. | 330/252 |
| 6,385,021 B1 * | 5/2002 | Takeda et al. | ................... | 361/56 |
| 6,400,541 B1 * | 6/2002 | Brett | ................................ | 361/56 |
| 6,847,511 B2 * | 1/2005 | Ohnakado et al. | .............. | 361/56 |
| 7,468,638 B1 * | 12/2008 | Tsai et al. | ...................... | 331/126 |
| 7,616,414 B2 * | 11/2009 | Marholev | ........................ | 361/56 |
| 2004/0251983 A1 * | 12/2004 | Hsu et al. | ......................... | 333/32 |
| 2006/0067440 A1 * | 3/2006 | Hsu et al. | ........................ | 375/345 |
| 2007/0247772 A1 * | 10/2007 | Keppens et al. | ................ | 361/56 |
| 2008/0062600 A1 * | 3/2008 | Crawley et al. | ................. | 361/56 |
| 2008/0186407 A1 * | 8/2008 | Miller et al. | .................. | 348/705 |
| 2010/0144305 A1 * | 6/2010 | Cook et al. | .................... | 455/334 |
| 2011/0199931 A1 * | 8/2011 | Anderson et al. | ............. | 370/252 |

FOREIGN PATENT DOCUMENTS

| | | |
|---|---|---|
| CN | 1384980 | 12/2002 |
| CN | 1541437 A | 10/2004 |
| CN | 1933013 A | 3/2007 |
| TW | I245406 | 12/2005 |
| TW | 200713164 | 4/2007 |

* cited by examiner

*Primary Examiner* — Ronald W Leja
(74) *Attorney, Agent, or Firm* — Thomas, Kayden, Horstemeyer & Risley, LLP

(57) ABSTRACT

The invention discloses a network communication processing apparatus capable of processing the cable discharge event. The network communication processing apparatus comprises an electrostatic protection circuit coupled between two signal pins used for transmitting/receiving the network signal on a cable. When the cable discharge event occurred on the cable, the electrostatic protection circuit will be turned on so that the two signal pins are short together to discharge back the electrostatic signal to the cable.

15 Claims, 3 Drawing Sheets

NETWORK COMMUNICATION PROCESSING APPARATUS WITH ESD PROTECTION

BACKGROUND OF THE INVENTION

1. Field of the Invention

The invention relates to a network communication apparatus, particularly to a network communication processing apparatus with electrostatic discharge protection.

2. Description of the Related Art

Electrostatic discharge (ESD) is the factor that causes the most electronic element to be destroyed by electrical overstress, such destroying could make the electronic element permanent damage, and therefore influences electronic element operation.

To solve the problem of electrostatic discharge, generally utilizing the switch mechanism of PN junction of parasitic bipolar junction transistor (BJT) to discharge the ESD through supply voltage VDD or ground GND. However, because of the cable discharge (CDE) (which is one type of ESD) may happened on the cable in Ethernet application and the energy of CDE entering the integrated circuit is transmitted in differential type, the integrated circuit will need larger electrostatic protection circuit to discharge the CDE if the CDE is discharged through supply voltage VDD or ground GND. Therefore, it will cost larger area of the integrated circuit.

SUMMARY OF THE INVENTION

Therefore, one object of the invention is to provide a network communication processing apparatus with ESD protection capable of rapidly discharging the cable discharge.

The invention provides a network communication processing apparatus comprising: a first pin, for transmitting or receiving a first network signal; a second pin, for transmitting or receiving a second network signal; and an electrostatic protection circuit, coupled between to the first and the second pins, for processing a first electrostatic signal via the first pin and a second electrostatic signal via the second pin; wherein, when the first and the second electrostatic signals are inputted into the network communication processing apparatus respectively via the first and the second pins, the electrostatic protection circuit is turned on so that the first pin and the second pin are substantially short together to discharge the first and the second electrostatic signals.

DETAILED DESCRIPTION OF THE INVENTION

Figure 1:
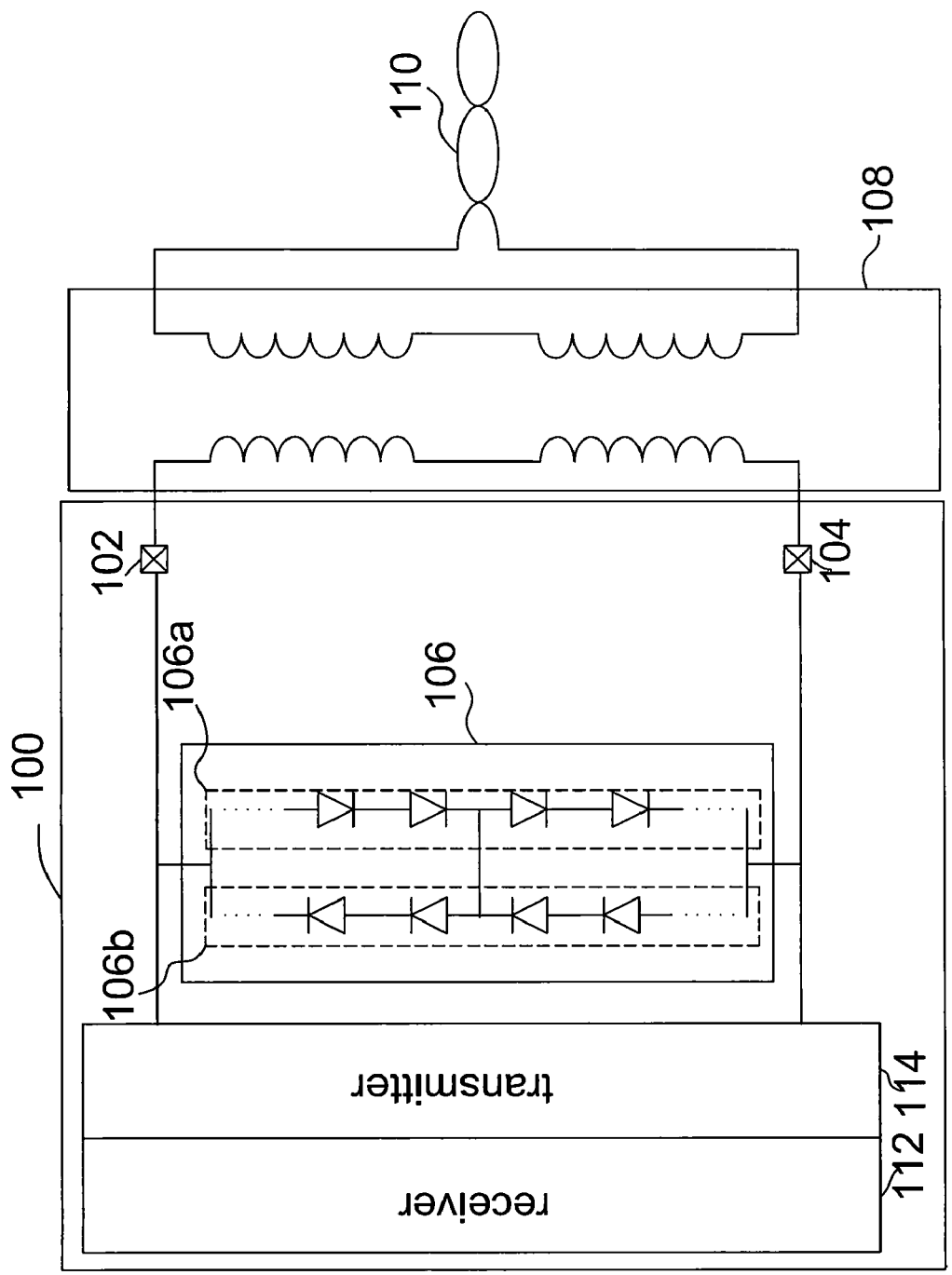
FIG. 1 shows a schematic diagram illustrating a network communication processing apparatus according to the first embodiment of the present invention.

Please refer to FIG. 1, which shows a schematic diagram illustrating a network communication processing apparatus according to the first embodiment of the present invention. The network communication processing apparatus 100 comprises a first network signal pin 102, for transmitting and receiving a first network signal; a second network signal pin 104, for transmitting and receiving a second network signal; an electrostatic protection circuit 106, coupled between to the first network signal pin 102 and the second network signal pin 104, the electrostatic protection circuit 106 processes the first and the second electrostatic signals received from the first network signal pin 102 and the second network signal pin 104. The electrostatic protection circuit 106 according to the first embodiment of the invention comprises a first serial connection diode unit 106a and a second serial connection diode unit 106b. Wherein, the anode of one diode in first serial connection diode unit 106a is coupled to the first network signal pin 102, the cathode of another diode in first serial connection diode is coupled to the second network signal pin 104; the anode of one diode in second serial connection diode unit 106b is coupled to the second network signal pin 104, the cathode of another diode in second serial connection diode unit 106b is coupled to the first network signal pin 102.

More detail about the operation of the network communication processing apparatus will be described in following. Please once again refer to the network communication processing apparatus 100 of FIG. 1, the electrostatic protection circuit 106 of the network communication processing apparatus 100 is turned off when the network communication is under normal operation. At normal operation, the network communication processing apparatus 100 transmits and receives the first network signal via first network signal pin 102 and second network signal via second network signal pin 104 by internal transmitter 114 and receiver 112 respectively, wherein, the first and the second network signals are transmitted in the form of differential signals on the cable. According to one embodiment, the cable can be implemented by RJ45.

When the cable discharge event (CDE) occurred on the cable, the electrostatic signal will flow into the network communication processing apparatus 100 through the transformer 108. As shown in figure, the first electrostatic signal and the second electrostatic signal of the cable discharge event flow into the network communication processing apparatus 100 respectively via the first network signal pin 102 and the second network signal pin 104. The first and the second electrostatic signals form a differential signal. When the voltage of the first electrostatic signal is larger than the second electrostatic signal over a threshold, the first serial connection diode unit 106a is turned on so that the first network signal pin 102 and the second network signal pin 104 are substantially short together. At this time, the first electrostatic signal will be discharged through the electrostatic protection circuit 106 and the second network signal pin 104. On the contrary, when the voltage of the second electrostatic signal is larger than the first electrostatic signal over a threshold, the second serial connection diode unit 106b is turned on so that the first network signal pin 102 and the second network signal pin 104 are substantially short together. At this time, the second electrostatic signal will be discharged through the electrostatic protection circuit 106 and the first network signal pin 102.

Figure 2:
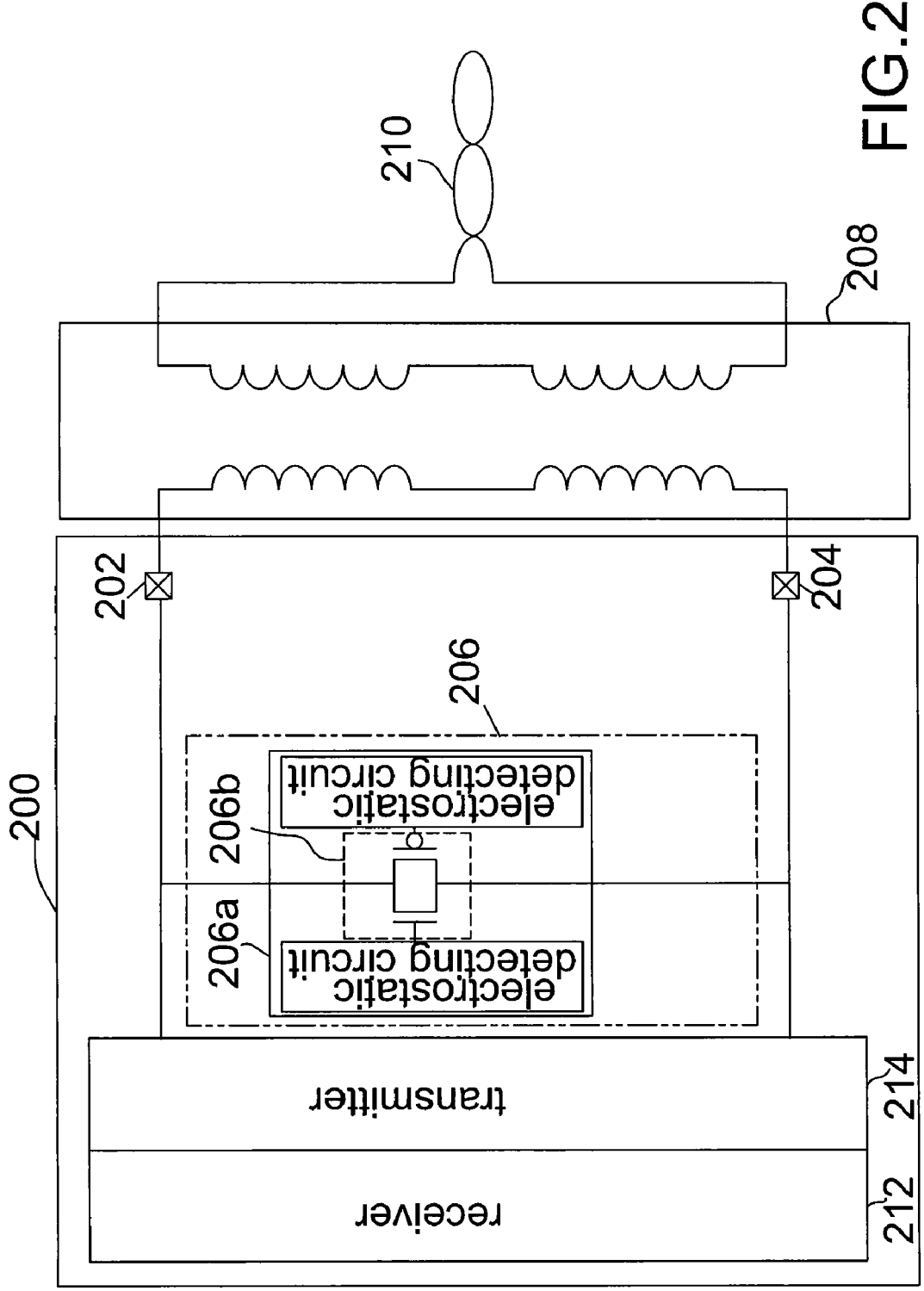
FIG. 2 shows a schematic diagram illustrating a network communication processing apparatus according to the second embodiment of the present invention.

Please refer to FIG. 2, which shows a schematic diagram of a network communication processing apparatus according to the second embodiment of the present invention. As shown in figure, the network communication processing apparatus 200 comprises a first network signal pin 202, for transmitting and receiving a first network signal; a second network signal pin 204, for transmitting and receiving a second network signal; an electrostatic protection circuit 206, coupled between to the first network signal pin 202 and the second network signal pin 204, the electrostatic protection circuit 206 processes the first and the second electrostatic signals received from the first network signal pin 202 and the second network signal pin 204. The electrostatic protection circuit 206 according to the second embodiment of the invention comprises an electrostatic detecting circuit 206a and a switch unit 206b. The electrostatic detecting circuit 206a is used to detect whether the electrostatic situation occurred on the cable 210. Switch unit 206b, according to one embodiment of the present invention, comprises a NMOS transistor and a PMOS transistor coupled in parallel.

According to the second embodiment, the operation is similar to the first embodiment. The electrostatic protection circuit 206 of the network communication processing apparatus 200 is turned off when the network communication is under normal operation. At normal operation, the network communication processing apparatus 200 transmits and receives the first network signal via first network signal pin 202 and second network signal via second network signal pin 204 by internal transmitter 214 and receiver 212 respectively. When the cable discharge event occurred on the cable, the electrostatic detecting circuit 206a will detect the electrostatic signal and turn on the switch unit 206b to make the first network signal pin 202 and the second network signal pin 204 substantially short together. Then, the cable discharge event will be discharged through the switch unit 206b, the first network signal pin 202 and the second network signal pin 204 after the path of switch unit 206b is turned on.

Figure 3:
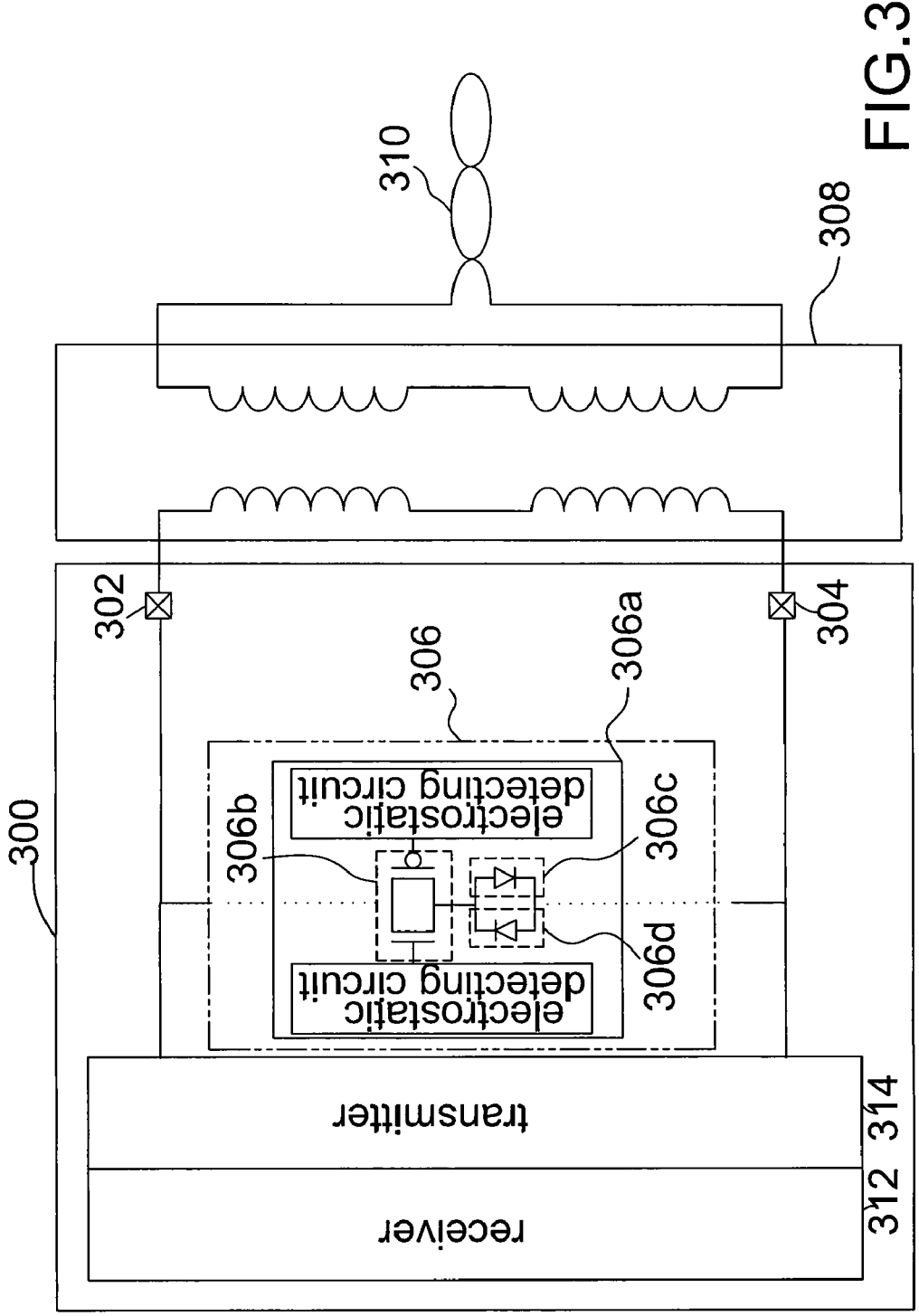
FIG. 3 shows a schematic diagram illustrating a network communication processing apparatus according to the third embodiment of the present invention.

Please refer to FIG. 3, which shows a schematic diagram of a network communication processing apparatus according to the third embodiment of the present invention. As shown in figure, the network communication processing apparatus 300 comprises a first network signal pin 302, for transmitting and receiving a first network signal; a second network signal pin 304, for transmitting and receiving a second network signal; an electrostatic protection circuit 306, coupled between to the first network signal pin 302 and the second network signal pin 304, the electrostatic protection circuit 306 processes the first and the second electrostatic signals received from the first network signal pin 302 and the second network signal pin 304. The electrostatic protection circuit 306 comprises an electrostatic detecting circuit 306a, a switch unit 306b and a diode units 306c, 306d. Wherein, the electrostatic detecting circuit 306a is used to detect whether the electrostatic situation occurred on the cable 310. And the switch unit 306b, according to one embodiment of the present invention, comprises a NMOS transistor and a PMOS transistor coupled in parallel.

According to the third embodiment, the operation is similar to the first and the second embodiments. The electrostatic protection circuit 306 of the network communication processing apparatus 300 is turned off when the network communication is under normal operation. At normal operation, the network communication processing apparatus 300 transmits and receives the first network signal via first network signal pin 302 and second network signal via second network signal pin 304 by internal transmitter 214 and receiver 212 respectively. When the cable discharge event occurred on the cable, the electrostatic detecting circuit 206a will detect the electrostatic signal and turn on the switch unit 306b to make the first network signal pin 302 and the second network signal pin 304 substantially short together. Then, the cable discharge event will be discharged through the switch unit 306b, the first network signal pin 302 and the second network signal pin 304 after the path of switch unit 306b is turned on.

In conclusion, the network communication processing apparatus of the invention sets an electrostatic protection circuit between the two network signal pins that can form a path to discharge the electrostatic signal via this two network signal pins to prevent the electrostatic discharge destroying the network communication processing apparatus. Besides, it is to be noticed that although the electrostatic protection circuit is only described on the above-mentioned three embodiments, but the invention should not be limited to the specific construction and arrangement. All the ways can reach the circuit of the electrostatic protection are belonged to the scope of the invention.

What is claimed is:

1. A network communication processing apparatus, coupled to an transformer, the transformer includes a primary side coupled to a cable and a second side coupled to the network communication processing apparatus, comprising:
    a first pin for transmitting or receiving a first network signal;
    a second pin for transmitting or receiving a second network signal; and
    an electrostatic protection circuit, coupled between to the first and the second pins, for processing a first electrostatic signal via the first pin and a second electrostatic signal via the second pin;
    wherein, when the first and the second electrostatic signals are inputted into the network communication processing apparatus respectively via the first and the second pins, the electrostatic protection circuit is turned on so that the first pin and the second pin are substantially short together to discharge the first and the second electrostatic signals; the electrostatic protection circuit is located on the secondary side.

2. The network communication processing apparatus according to claim 1, wherein the electrostatic protection circuit comprises:
    a first serial connection diode unit, having a first anode coupled to the first pin and having a first cathode coupled to the second pin; and
    a second serial connection diode unit, having a second anode coupled to the second pin and having a second cathode coupled to the first pin;
    wherein, when the first and the second electrostatic signals are inputted into the network communication processing apparatus, the first electrostatic signal is discharged through the second pin by the first serial connection diode unit and the second electrostatic signal is discharged through the first pin by the second serial connection diode unit; at least one end of the first serial connection diode unit couples to the second serial connection diode unit so that part of the first serial connection diode unit couple to part of the second serial connection diode unit in parallel.

3. The network communication processing apparatus according to claim 1, wherein the electrostatic protection circuit comprises:
    a switch unit, coupled between the first and the second pins; and
    an electrostatic detecting circuit, coupled between the first and the second pins, for detecting the electrostatic signal on the first and the second pins;
    wherein, when the first and the second electrostatic signals are inputted into the network communication processing apparatus, the electrostatic detecting circuit turns on the switch unit so that the first and the second electrostatic signals are discharged though the first and the second pins.

4. The network communication processing apparatus according to claim 3, wherein the electrostatic protection circuit further comprises a diode unit, coupled between the switch unit and the second pin.

5. The network communication processing apparatus according to claim 3, wherein the switch unit is implemented by a NMOS transistor and a PMOS transistor coupled in parallel.

6. The network communication processing apparatus according to claim 1, wherein the first and the second electrostatic signals form a differential signal.

7. The network communication processing apparatus according to claim 1, wherein the first and the second electrostatic signals are a cable discharge signal.

8. The network communication processing apparatus according to claim 1, is applied to an Ethernet.

9. A network communication processing apparatus, coupled to an transformer, the transformer includes a primary side coupled to a cable and a secondary side coupled to the network communication processing apparatus, comprising:
   a first pin for transmitting or receiving a first network signal;
   a second pin for transmitting or receiving a second network signal; and
   an electrostatic protection circuit, coupled between to the first and the second pins, for processing a electrostatic signal from the first pin;
   wherein, when the electrostatic signal are inputted into the network communication processing apparatus from the first pin, the electrostatic protection circuit is turned on so that the electrostatic signal flows through the electrostatic protection circuit and being discharged by the second pin; the electrostatic protection circuit is located on the secondary side.

10. The network communication processing apparatus according to claim 9, wherein the electrostatic protection circuit comprises:
   a serial connection diode unit coupled between the first and the second pins;
   wherein, when the electrostatic signal is inputted into network communication processing apparatus from the first pin, the electrostatic signal flows through the serial connection diode unit and being discharged by the second pin.

11. The network communication processing apparatus according to claim 9, wherein the electrostatic protection circuit comprises:
   a switch unit, coupled between the first and the second pins; and
   an electrostatic detecting circuit coupled between the first and the second pins;
   wherein, when the electrostatic signal is inputted into network communication processing apparatus from the first pin, the electrostatic detecting circuit turns on the switch unit so that the electrostatic signal flows through the switch unit and being discharges by the second pin.

12. The network communication processing apparatus according to claim 11, wherein the electrostatic protection circuit further comprises a diode unit coupled between the switch unit and the second pin.

13. The network communication processing apparatus according to claim 11, wherein the switch unit is implemented by a NMOS transistor and a PMOS transistor coupled in parallel.

14. The network communication processing apparatus according to claim 9, wherein the first and the second electrostatic signals are a cable discharge signal.

15. The network communication processing apparatus according to claim 9, is applied to an Ethernet.

* * * * *